US010977745B1

(12) United States Patent
Chiang et al.

(10) Patent No.: US 10,977,745 B1
(45) Date of Patent: Apr. 13, 2021

(54) COMPUTER-IMPLEMENTED METHODS SYSTEMS AND ARTICLES OF MANUFACTURE FOR GENERATING USER INTERFACE WITH PERSONALIZED RESPONSE TO USER QUERY

(71) Applicant: INTUIT INC., Mountain View, CA (US)

(72) Inventors: Justin R. Chiang, San Diego, CA (US); Paul F. Hubbard, San Diego, CA (US); Rushabh N. Mehta, San Diego, CA (US); Jeremy Charfauros, San Diego, CA (US); Jennifer L. Keenan, San Diego, CA (US); Michael A. Artamonov, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 367 days.

(21) Appl. No.: 15/908,362

(22) Filed: Feb. 28, 2018

(51) Int. Cl.

| | |
|---|---|
| ***G06Q 40/00*** | (2012.01) |
| ***G06F 9/451*** | (2018.01) |
| ***G06F 16/35*** | (2019.01) |
| ***G06F 16/332*** | (2019.01) |
| ***G06F 16/9535*** | (2019.01) |

(52) U.S. Cl.
CPC ........... *G06Q 40/123* (2013.12); *G06F 9/453* (2018.02); *G06F 16/3329* (2019.01); *G06F 16/35* (2019.01); *G06F 16/9535* (2019.01)

(58) Field of Classification Search
CPC ....... G06Q 40/123; G06F 9/453; G06F 16/35; G06F 16/3329; G06F 16/9535
USPC ........................................................ 707/758
See application file for complete search history.

(56) References Cited

U.S. PATENT DOCUMENTS

| | | | | |
|---|---|---|---|---|
| 8,417,597 | B1 * | 4/2013 | McVickar | ............ G06Q 40/123 705/31 |
| 9,760,953 | B1 | 9/2017 | Wang et al. | |
| 9,916,628 | B1 | 3/2018 | Wang et al. | |

(Continued)

OTHER PUBLICATIONS https://aws.amazon.com/what-is-cloud-computing/, printed: Feb. 27, 2018 (5pages).

(Continued)

*Primary Examiner* — Evan Aspinwall
(74) *Attorney, Agent, or Firm* — DLA Piper LLP (US)

(57) ABSTRACT

Computerized systems and methods for generating personalized responses to queries originating from within a networked computing system or user facing application, e.g., in response to a help inquiry. An intermediate computer generates a first interface presented to user through a display of a computing device executing a browser to access application. Query is entered into a field of first interface and processed by a classifier that outputs a structure identifier. Intermediate computer configures a remote computer by transmitting structure identifier, electronic data related to an electronic document and an executable file to remote computer, which executes file to process electronic data relative to a data structure hosted by remote computer and associated with structure identifier to select a template identifier. Intermediate computer receives selected template identifier, retrieves an interface template, and automatically generates a second user interface by populating interface template with electronic data to generate personalized response to query.

24 Claims, 11 Drawing Sheets

(56) References Cited

U.S. PATENT DOCUMENTS

| | | | | |
|---|---|---|---|---|
| 2017/0177715 | A1* | 6/2017 | Chang | G06F 40/186 |
| 2017/0213157 | A1* | 7/2017 | Bugay | G06F 40/30 |
| 2019/0108228 | A1* | 4/2019 | Zeng | G06N 3/084 |

OTHER PUBLICATIONS https://en.wikipedia.org/wiki/Statistical_classification, printed: Feb. 27, 2018 (4pages).

* cited by examiner

| | Col1 | Col2 | Col3 | Col4 | Col5 | Col6 | Col7 |
|---|---|---|---|---|---|---|---|
| | 276a | 276b | 276c | 276d | 276e | 276f | 276g |
| Row1 / $Rule_1$ | Y | ? | N | ? | ? | ? | ? |
| Row2 / $Rule_2$ | Y | ? | Y | ? | ? | ? | Y |
| Row3 / $Rule_3$ | N | Y | ? | ? | Y | ? | Y |
| Row4 / $Rule_4$ | N | Y | ? | ? | N | N | ? |
| Row5 / $Rule_5$ | N | N | ? | N | ? | N | ? |

| | A | B | C | D | E | F | G | H | I | J |
|---|---|---|---|---|---|---|---|---|---|---|
| 1 | Field | RNA-USECASE-708 | RNA-USECASE-714 | RNA-USECASE-715 | RNA-USECASE-716 | RNA-USECASE-720 | RNA-USECASE-128 | RNA-USECASE-130 | RNA-TEST-1 | |
| 2 | dose | too early to amend | accepted | pending | rejected | not rejected | accepted | rejected | junk test for undrscores and da |
| 3 | | | | | | | | | | |
| 4 | Parameters | | | | | | | | | |
| 5 | Topic | Access_Current_Ye | Access_Current_Ye | Access_Current_Ye | Access_Current_Ye | Access_Current_Ye | Enter_1099-R | Enter_1099-R | rna-123_a | |
| 6 | Inputs | | | | | | | | | |
| 7 | /RNA/Deadlines/IsW2 Ready | | | | | | | | | |
| 8 | /RNA/Deadlines/Is1040xReady | FALSE | TRUE | TRUE | TRUE | TRUE | | | | |
| 9 | /RNA/EFileStatus/Accepted | | TRUE | FALSE | FALSE | FALSE | | | | |
| 10 | /RNA/EFileStatus/Pending | | | TRUE | FALSE | FALSE | | TRUE | FALSE | |
| 11 | /RNA/EFileStatus/Rejected | | | | TRUE | FALSE | | | | |
| 12 | | | | | | | | | | |
| 13 | Asserts | | | | | | | | | |
| 14 | //Job[@name="Access_Current_Year"]/@outcome | UC708 | UC714 | UC715 | UC716 | UC720 | | | | |
| 15 | //Job[@name="Enter_1099-R"]/@outcome | | | | | | UC128 | UC130 | | |
| 16 | //Job[@name="rna-123_a"]/@outcome | | | | | | | | happy | |

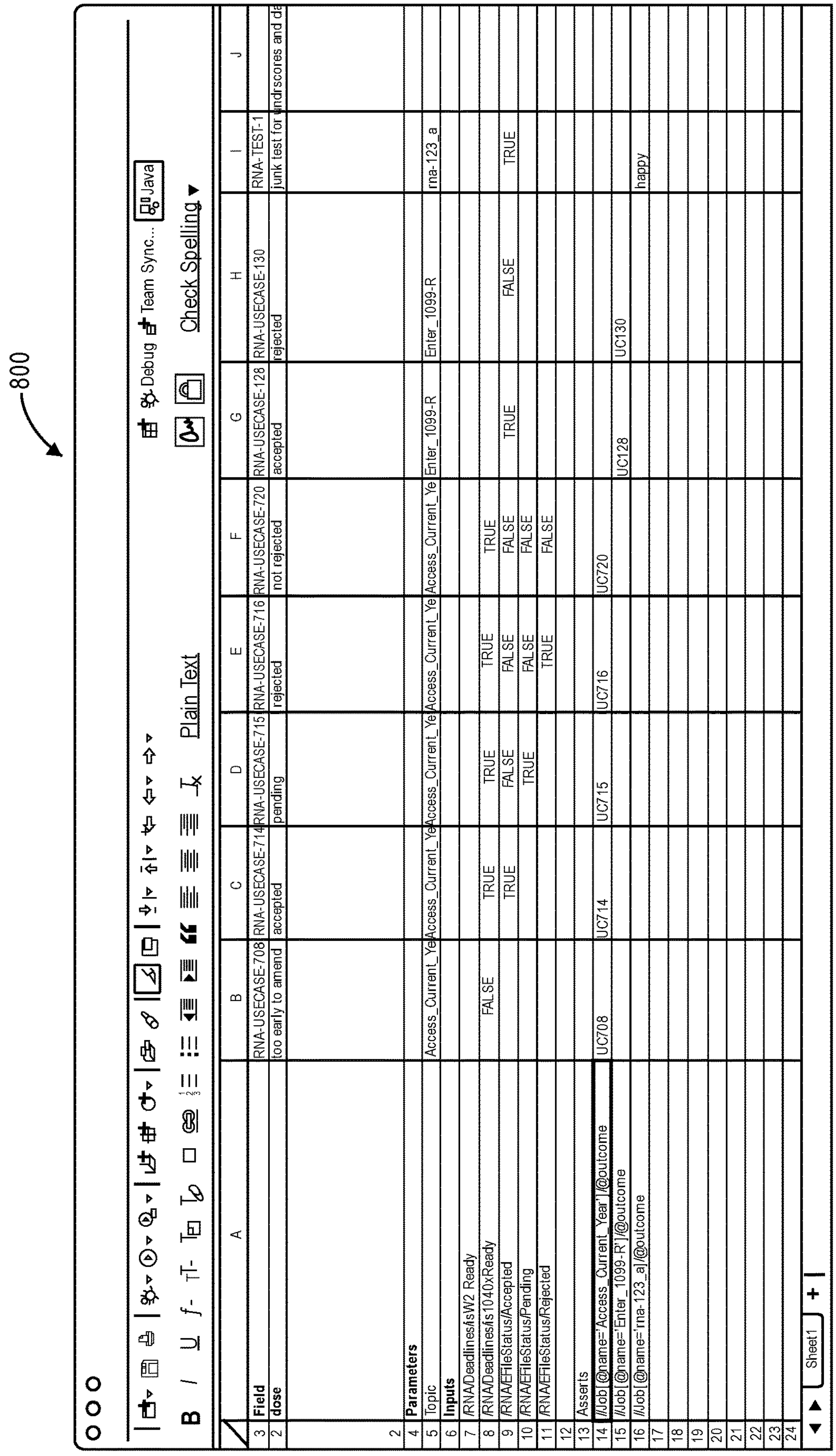

FIG. 8

RNA tests

Info
- ma_all_tests.xml
- 1 test
- 0 groups
- Times
- Reporter output
- Ignored methods
- Chronological view

Results
- 116 methods, 116 passed
- Passed methods (hide)
  - ☑ testTKECompleteness(Amend_Prior_Year_2015-UC268)
  - ☑ testTKECompleteness(RNA-USECASE-369)
  - ☑ testTKECompleteness(RNA-USECASE-720)
  - ☑ testTKECompleteness(Schedule_A-UC207)
  - ☑ testTKECompleteness(RNA-USECASE-728)
  - ☑ testTKECompleteness(Schedule_D-UC360)
  - ☑ testTKECompleteness(RNA1-UC22)
  - ☑ testTKECompleteness(Amend_Prior_Year_2015-UC271)
  - ☑ testTKECompleteness(Schedule_D-UC228)
  - ☑ testTKECompleteness(Schedule_A-UC209)
  - ☑ testTKECompleteness(Schedule_A-UC210)
  - ☑ testTKECompleteness(Schedule_D-UC230)
  - ☑ testTKECompleteness(RNA229-UC747)
  - ☑ testTKECompleteness(Schedule_D-UC357)

☑ com.intuit.ctg.taxengine.automation.calc.TestTKECompleteness

- testTKECompleteness (Amend_Prior_Year_2015-UC268) *(TKE Completeness test)*
- testTKECompleteness (RNA-USECASE-369) *(TKE Completeness test)*
- testTKECompleteness (RNA-USECASE-720) *(TKE Completeness test)*
- testTKECompleteness (Schedule_A-UC207) *(TKE Completeness test)*
- testTKECompleteness (RNA-USECASE-728) *(TKE Completeness test)*
- testTKECompleteness (Schedule_D-UC360) *(TKE Completeness test)*
- testTKECompleteness (RNA1-UC22) *(TKE Completeness test)*
- testTKECompleteness (Amend_Prior_Year_2015-UC271) *(TKE Completeness test)*
- testTKECompleteness (Schedule_D-UC228) *(TKE Completeness test)*
- testTKECompleteness (Schedule_A-UC209) *(TKE Completeness test)*
- testTKECompleteness (Schedule_A-UC210) *(TKE Completeness test)*
- testTKECompleteness (Schedule_D-UC230) *(TKE Completeness test)*
- testTKECompleteness (RNA229-UC747) *(TKE Completeness test)*
- testTKECompleteness (Schedule_D-UC357) *(TKE Completeness test)*
- testTKECompleteness (RNA-USECASE-716) *(TKE Completeness test)*
- testTKECompleteness (Print_Prior_Year_2015-UC4) *(TKE Completeness test)*
- testTKECompleteness (RNA-USECASE-715) *(TKE Completeness test)*
- testTKECompleteness (Upgrade_Button-UC297) *(TKE Completeness test)*

900

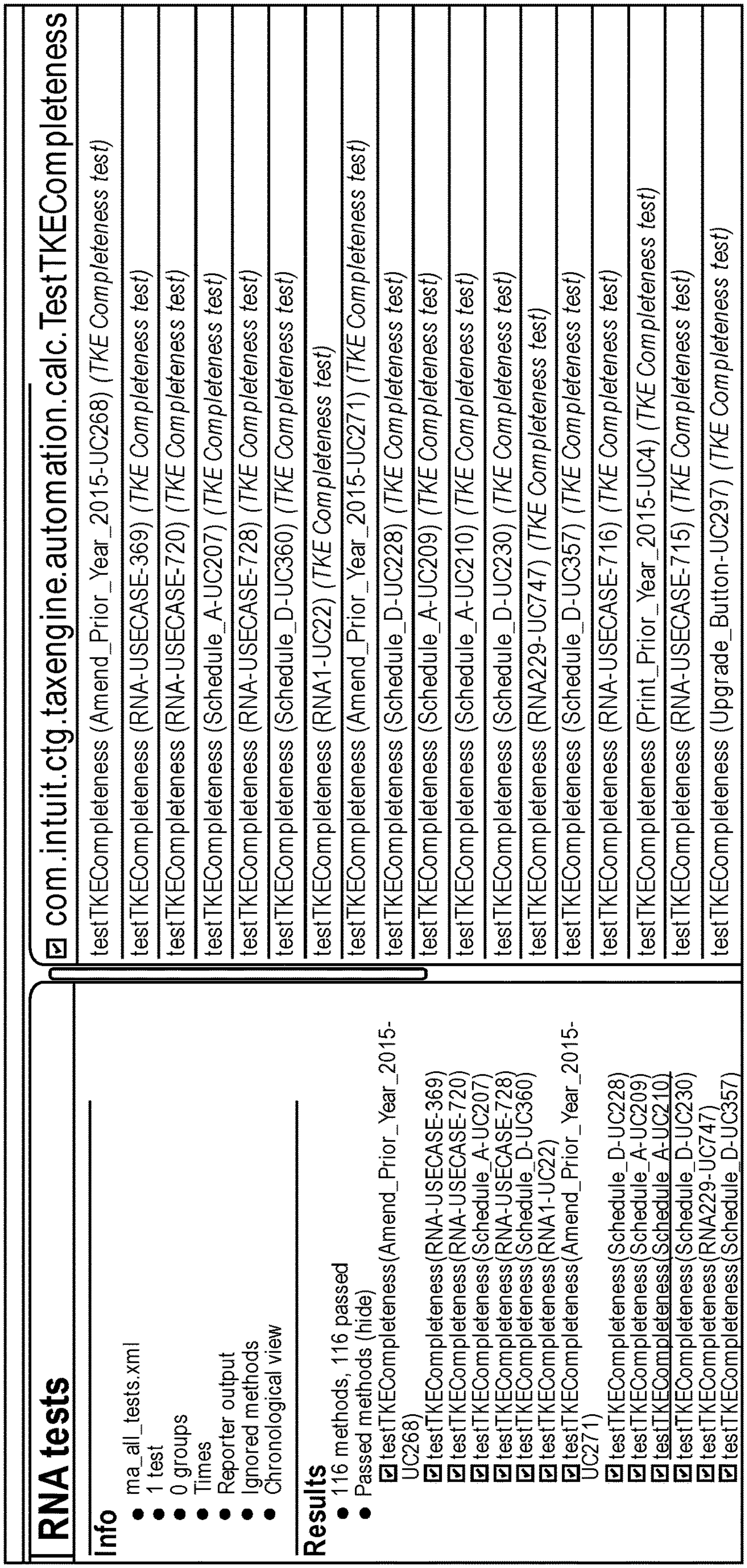

FIG. 9

COMPUTER-IMPLEMENTED METHODS SYSTEMS AND ARTICLES OF MANUFACTURE FOR GENERATING USER INTERFACE WITH PERSONALIZED RESPONSE TO USER QUERY

FIELD OF THE TECHNOLOGY

Embodiments of the present invention relate to technical fields of interactive computer-generated user interfaces and computing systems and methods for generating interactive user interfaces, and more particularly, to generating interactive user interfaces including personalized answers to user queries originating from within networked computing systems and user facing applications.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

SUMMARY

Embodiments address technical restrictions and inflexibility of known computing systems and computer generated user interfaces that include pre-defined responses to user queries and provide for more accurate query responses while doing so in a more efficient manner within a networked computing system.

Embodiments also provide for reduced end user-customer support network communications and processing of same by respective computing devices as a result of how a user's query is processed and the resulting user interface generated in response thereto, thereby reducing consumption of computing and network or communication resources that would otherwise be utilized due to a user being presented with a canned or pre-determined response that is less likely to address the user's query compared to user interfaces including personalized query responses generated according to embodiments. Thus, embodiments not only provide for more computer generated user interfaces with more accurate and meaningful query responses, but do so in a more efficient manner from the perspective of at least a computing device within a networked computing system that hosts a user facing application through which a query is submitted, and also from the perspective of the end user or customer since a more accurate query response is less likely to require additional computer interactions and requests by the user and associated computing resources and network communications.

Embodiments provide for more personalized, accurate and meaningful responses while providing for a more efficient interactive question-and-answer user interfaces and computing systems, as well as providing for actionable links or buttons that can direct a user to a page or form that is the subject of the user's query or more likely to be the subject of the user's query, thus reducing computing and network or communication resources required to direct the user to the page or form that is the subject of the query or to address the user's question.

Embodiments provide improvements to user facing applications that include, for example, user interfaces with "help" or "question" menus or Q&A websites that allow a user to type in a query or keywords thereof in order to identify an answer to the user's query or search for topics related to the query.

Embodiments also provide improvements to distributed computing systems and how cloud based computing resources can be utilized for selected analysis of personalized responses to user queries submitted through a computer generated user interface of an end user facing application that is not executed by or hosted by the cloud based computing resource, thus providing for reduced consumption of host computing resources by use of distributed computing system configurations.

Embodiments of the present invention address restrictions and inefficiencies of known computing applications that provide for "help" menus and user submitted queries, interactive user interfaces generated thereby, thus providing for more efficient and reduced user-customer service communications.

Embodiments of the invention provide that user interface and user facing application improvements by generating a personalized response to a query submitted through the user facing application and from which a user may also be directed to another page or form to execute a related action related to the query and response as a result of rule-based processing involving specific data structures and interface templates that are selected to be automatically populated, thus providing for improved computer generated user interfaces and user interactions with same, while reducing or eliminating the need for users to contact hosts or customer support, or to engage with Q&A websites.

Embodiments also relate to Software as a Service (SaaS) based query response personalization.

One embodiment involves a computer-implemented method executed by an intermediate or host computer, or the intermediate or host computer and a remote computer, such as a cloud based resources or SaaS. The intermediate computer is in communication through a first network with a computing device executing a browser that allows a user to access a customer or end user facing application hosted by the intermediate computer and executed to prepare an electronic document and in communication through a second network with a remote computer, such as a cloud based resource or computer, which may be managed by the same or different hosts. The intermediate computer, by the user facing application, presents a first user interface of the end user application to a user through a display of the computing device in response to user interaction with the user facing application through the browser. The first interactive interface includes a field into which a query about the electronic document is entered. The intermediate computer, by the user facing application, transmits the query to a machine learning element, such as a classifier, which processes the query and generates a result in the form of a structure identifier, which is received by the intermediate computer, which then configures the remote computer for execution. For this purpose, the intermediate computer, by the user facing application, transmits the structure identifier, electronic data related to the electronic document and an executable file through a second network to the remote computer, which executes the executable file to process the electronic data relative to a data structure hosted by the remote computer and associated with the structure identifier and select a template identifier from a plurality of template identifiers of the associated data structure. The intermediate computer receives the selected template identifier from the remote computer and retrieves an interface template referenced by the template identifier from an interface template database. The intermediate computer then automatically generates a second user interface by populating the interface template with electronic data related to the electronic document to generate a personalized response to the query, and the second user interface is presented to the user through the display of the computing device.

Another embodiment is for a computing system, which may be implemented as software, hardware, programmable logic such as Programmable Logic Devices (PLDs) or combinations thereof, for generating and presenting personalized query responses within a networked computing system. System embodiments may include only the intermediate computer, or the intermediate computer and one or more or all of the remote computer, classifier, interface template database and database of electronic data of users of the application hosted by the intermediate computer, one or more of which may also be remote or modular elements in a distributed computing system.

Further embodiments are for articles of manufacture or computer program products comprising a non-transitory computer readable storage medium embodying one or more instructions executable by a processor of a computer to perform computer-implemented method embodiments.

Other embodiments are for computer generated interactive user interfaces and structures of same and how such user interfaces are generated and structured and with which users may interact, e.g., to be directed to a particular form, page or interview screen pertinent to a personalized query response.

In a single or multiple embodiments, the remote computer that executes the executable file is a computer of a cloud services platform. The classifier or other machine learning component that serves to generate an intermediate "key" or "reference" for use by the remote computer may also be located remotely relative to the intermediate computer or part of or utilized by the user facing application hosted by the intermediate computer. Thus, embodiments may be implemented using different non-generic arrangements of computing system elements and different allocations of processing among user computing devices, the intermediate or host computer, and the remote computer. In a single or multiple embodiments, the classifier and the remote computer execute independently of each other such that it is not necessary for these system elements to communicate with each other.

In a single or multiple embodiments, e.g., for when a remote computing resource is managed by a third party other than the host of the user facing application, the user facing application can be configured to control how the remote computer is utilized. For example, the intermediate computer, by the user facing application, configures the remote computer for execution by transmitting the structure identifier output by the classifier, the electronic data related to the electronic document (e.g. stored by the user's browser and included with the query submitted through the first interactive user interface) and an executable file to the remote computer, e.g., in a single electronic message transmitted through the second network to a file system of the remote computer. After the remote computer is utilized to analyze the electronic data relative to the data structure associated with the identifier output by the classifier, the electronic data may then be deleted from the remote computer. This stateless remote computer configuration and operation provides for more secure electronic data as a result of selective transmission (to the remote computer, not the classifier) and removal or deletion of the electronic data after processing concerning same has been completed by the remote computer.

In a single or multiple embodiments, the interface template that is retrieved, e.g., from a separate template database and based on the template identifier resulting from processing executed by the remote computer, is a Hypertext Transfer Protocol (HTTP) template, at least in cases in which the user facing application is a web-based application accessed by a browser. One example of a user facing application for which embodiments may be executed is an online computerized tax return preparation application operable to prepare an electronic tax return. Another example of a user facing application for which embodiments may be executed is an online computerized financial management system or online accounting application, which generates an electronic financial statement or form. It will be understood that these applications are non-limiting examples, and that various applications that provide for query submission or help interfaces may include or be improved by embodiments.

In a single or multiple embodiments, the remote computer is loaded with a plurality of data structures before intermediate computer processing. Respective data structures (e.g., table structures, or a transformed or compiled version of a completion graph structure), are associated with respective structure identifies such that analysis of the electronic data is performed with reference to a data structure identified by the classifier output.

In a single or multiple embodiments, the data structures hosted by or loaded to the remote computer are in the form of decision tables with columns and rows that define respective cells. Respective columns identify respective template identifiers and respective rows are associated with respective rules such that respective cells defined by respective columns and respective rows are for respective electronic data related to the electronic document to be analyzed by the rule-based engine of the remote computer. According to one embodiment, decision table data structures utilized for this purpose are generated by compiling or transforming a first data structure format into a second data structure format, e.g., a graphical format into a decision table format, which does not reflect any pre-determined flow or question and answer sequence.

In a single or multiple embodiments, the user is granted access to the user facing application and the field is populated with the query after the user has logged into the user facing application. The login information identifying the user is utilized by the user facing application to retrieve electronic data for that user from a data store or database, and the retrieved electronic data for that user is stored locally on the user's computing device by the browser. In this manner, when the user submits a query through the user facing application accessed by the browser, the query is transmitted to the intermediate computer together with the electronic data locally stored in the browser, but the query text or data only (and not the user's electronic data) is provided to the classifier, whereas the user's electronic data is passed through to the remote computer for analysis but then deleted from the remote computer after the analysis has been completed.

In a single or multiple embodiments, the query is in the form of one or more keywords entered by the user into the field of the first user interface, and the second user interface generated according to embodiments is structured according to an identified template and populated to include a predetermined question related to the at least one keyword and a personalized answer incorporating the electronic data, and may also include a button or link to selectable by the user through the user facing application to execute a pre-determined action based on the personalized answer or to jump directly to a pertinent page or form, thus eliminating or reducing the need for the user to engage in additional communications with the host, customer support or a Q&A service.

BRIEF DESCRIPTION OF THE DRAWINGS

FIG. 8 illustrates a computerized spreadsheet that can be utilized as a data entry record to test completion graph execution and whether processing of same results in identifying a single template identifier or use case that is selected for generating a user interface including a personalized query response;

FIG. 9 illustrates an example of a report generated for completion graph testing and whether processing of same results in identifying a single template identifier or use case that is selected for generating a user interface including a personalized query response.

DETAILED DESCRIPTION OF ILLUSTRATED EMBODIMENTS

Embodiments of the present invention provide for computer generated user interfaces that include personalized or customized responses or answers to user queries submitted through a program or application in a networked computing system. For example, a user may submit a query through a "help" screen or interface of an online application accessed by a browser executed by a user's computing device, and embodiments, in response to this help query, generate a personalized or customized response or answer that is presented to the user.

By providing personalized and more accurate and meaningful query responses in an unconventional manner, embodiments provide improvements to user facing applications such as electronic document preparation applications and computer generated user interfaces and content thereof and user interactions with such applications and interfaces to provide for personalized responses to user inquiries and more efficient computing systems and user interactions with same. Thus, with embodiments, rather than responding to an inquiry with a pre-determined response or interface as is common in traditional systems or relying upon a Frequently Asked Question (FAQ), embodiments of the invention instead provide a customized or personalized response that incorporates electronic data of the electronic document being prepared, thus providing for a more meaningful and contextually relevant response that is more likely to address the user's query thus eliminating or reducing the need for the user to engage in additional communications with the host, customer support or a Q&A website or FAQ webpages, thus reducing consumption of computing resources and network communications associated with responding to user queries, e.g., a query submitted through a "help" menu or interface and providing for more efficient and improved user interactions with user facing applications.

Figure 1A:
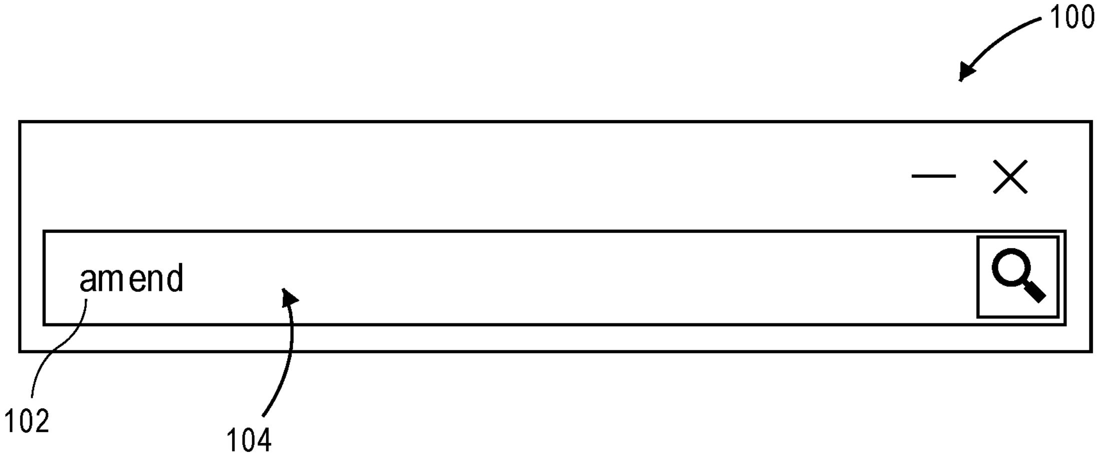
FIG. 1A illustrates an example of a portion of a computer generated user interface that allows a user to submit a query such as a "help" query regarding a user facing application or electronic document generated by the user facing application.
Figure 1B:
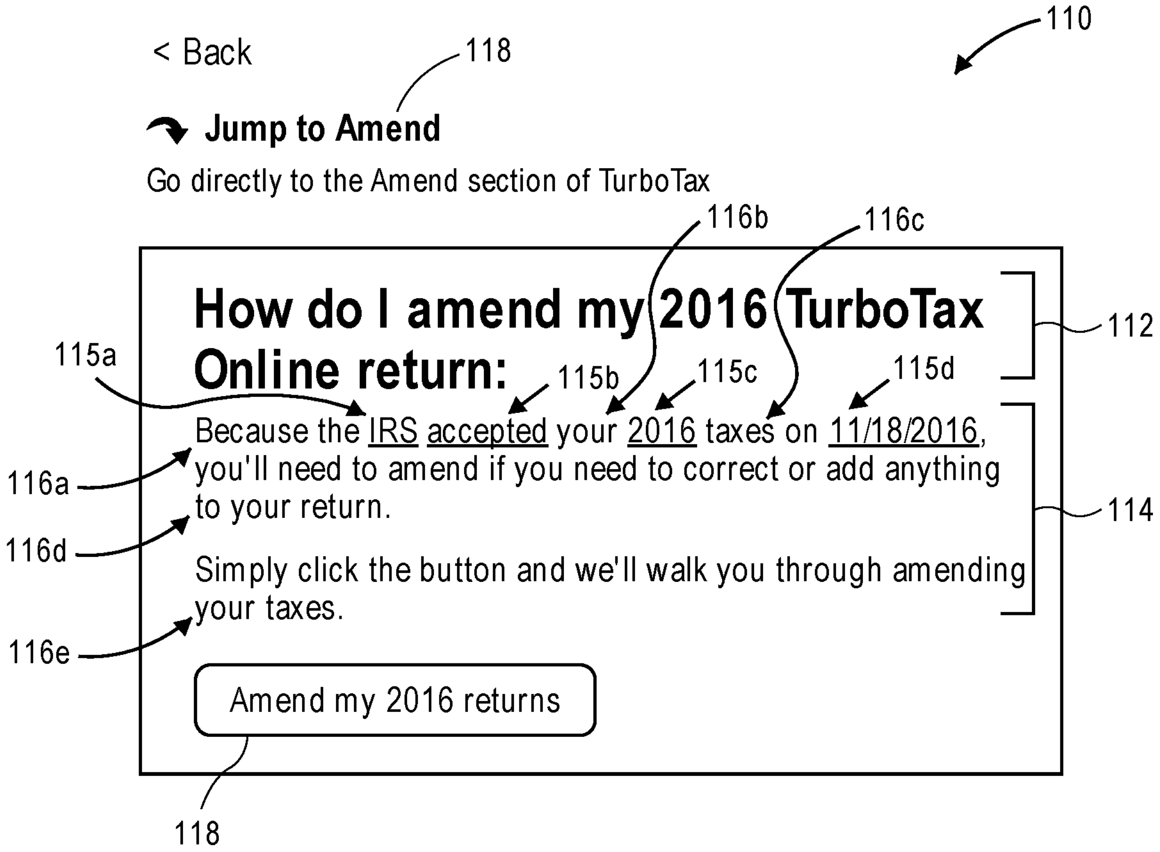
FIG. 1B illustrates a computer generated user interface structured according to one embodiment including a personalized response to the query.

For example, referring to FIGS. 1A-B, embodiments may involve an electronic document preparation application in the form of an online computerized tax return preparation application that is used to generate an electronic tax return. Online computerized tax return preparation includes a first interview screen or interface 100 that is presented to the user. First interface 100 may be presented in response to selection of a "help" button, icon or menu of an interview screen generated by the computerized tax return preparation application during preparation of an electronic tax return. Online computerized tax return preparation application can be programmed or configured according to embodiments to generate customized or personalized responses to user queries incorporating data of or relating to the electronic tax return and/or user.

For example, a user may enter a query 102 into a field 104 of first interface 100. Query 102 may be in the form of one or more keywords (e.g., "amend" in the illustrated example) or a question ("do I have to file an amended return?"). The resulting second interface 110 generated in response to query 102 and according to embodiments includes a question 112 determined to correspond to the query 102 and a personalized answer or response 114 (personalized response 114) to question 112. As shown in FIG. 1B, personalized response 114 includes user-specific data, which may be data about the user and/or electronic tax return or other electronic document being prepared and pulled from said sources. In the illustrated embodiment, personalized response 114 is a composite or hybrid response that is structured based at least in part upon electronic data from different sources. For example, certain portions 115*a-d* of personalized response 114 are user-specific or electronic document specific data that was used to populate fillable fields of a selected template. Examples of user-specific or electronic document specific data in the context of an example involving an electronic tax return may include the name or identifier for the tax authority with which the electronic tax return was filed (for example, IRS), the filing status of the electronic tax return (for example, accepted), the tax year (for example, 2016) and the filing date (for example, Nov. 18, 2016). It will be understood that different types of user specific or electronic tax return specific data may be included in personalized response 114 depending on the nature of query 102, and that other types of data may be used depending on the user facing application and type of electronic document being prepared and associated queries 102 concerning same.

In the embodiment illustrated in FIG. 1B, other portions 116*a-e* of personalized response 114 are portions of a selected response template. Thus, an original template may include portions 116*a-e* and fillable fields to be populated and associated question 112, and those fillable fields are populated with respective electronic data 115*a-d* to generate a composite or hybrid response that is customized and personalized for the user to respond to query 102.

Second interface 110 may also include an interactive UI element 118 such as a button, link or menu option that is part of the selected template and that can be selected by user to execute an action related to personalized response 114. In the illustrated embodiment, second interface 110 includes a UI element 118 in the form of a button which, when selected by user, directs user to another interface or screen to amend a prior year return, which is the subject of query 102, the determined question 112 for the query 102, and the subject of personalized response 114. Thus, embodiments may provide for additional levels of customization and personalization by including interactive UI element 118 related to personalized response 114 and that allows user to take direct action related to personalized response 114 to further reduce further searching and navigation, e.g., in a Q&A website or FAQ page, and eliminating or reducing further communications with customer support and processing of same.

Thus, second interface 110 structured to include personalized response 114 with electronic document specific and/or user specific data addresses query 102, is based on question 112 determined to correspond to query 102, and does so with specific details germane to user or user's electronic document. This is in contrast query responses that are general and/or pre-determined as is common in traditional systems. Embodiments are thus more likely to have query 102 answered such that user is less likely to, or will not need to, submit further queries 102, contact customer support of host, connect to and interact with a Q&A website related to the electronic document being prepared or engage in further interactions or browsing. These improvements thus provide for more accurate query responses and improve efficiency of not only associated computing systems but also user interactions by reducing or eliminating computing and network or communication resources required to process help queries 102 and reducing interactions with computing devices by the user in order to obtain a response that addresses the user's query. The need for additional processing of user interactions and communications can also be reduced as a result of UI element 118 related to query 102, question 112 and personalized response 114 thus providing a direct link to an associated form or interview screen. Moreover, auto-population of templates with user-specific data or electronic specific data to generate second interface 110 provides for more efficient generation user interfaces and eliminates the need for tedious manual programming of same. Thus, embodiments provide a number of technological improvements, improvements to known query-response systems and methods and improvements to user facing applications including electronic document generation applications, computer generated user interfaces of same. Further, as described in further detail below, embodiments also provide for a unique, non-generic arrangement of computing system elements that operate in an unconventional manner, and with the distributed computing system configuration, can leverage cloud based computing resources or SaaS that are specifically configured to execute embodiments while securely maintaining sensitive user data. Various embodiments and aspects thereof are described in further detail with reference to FIGS. 2-10.

Figure 2:
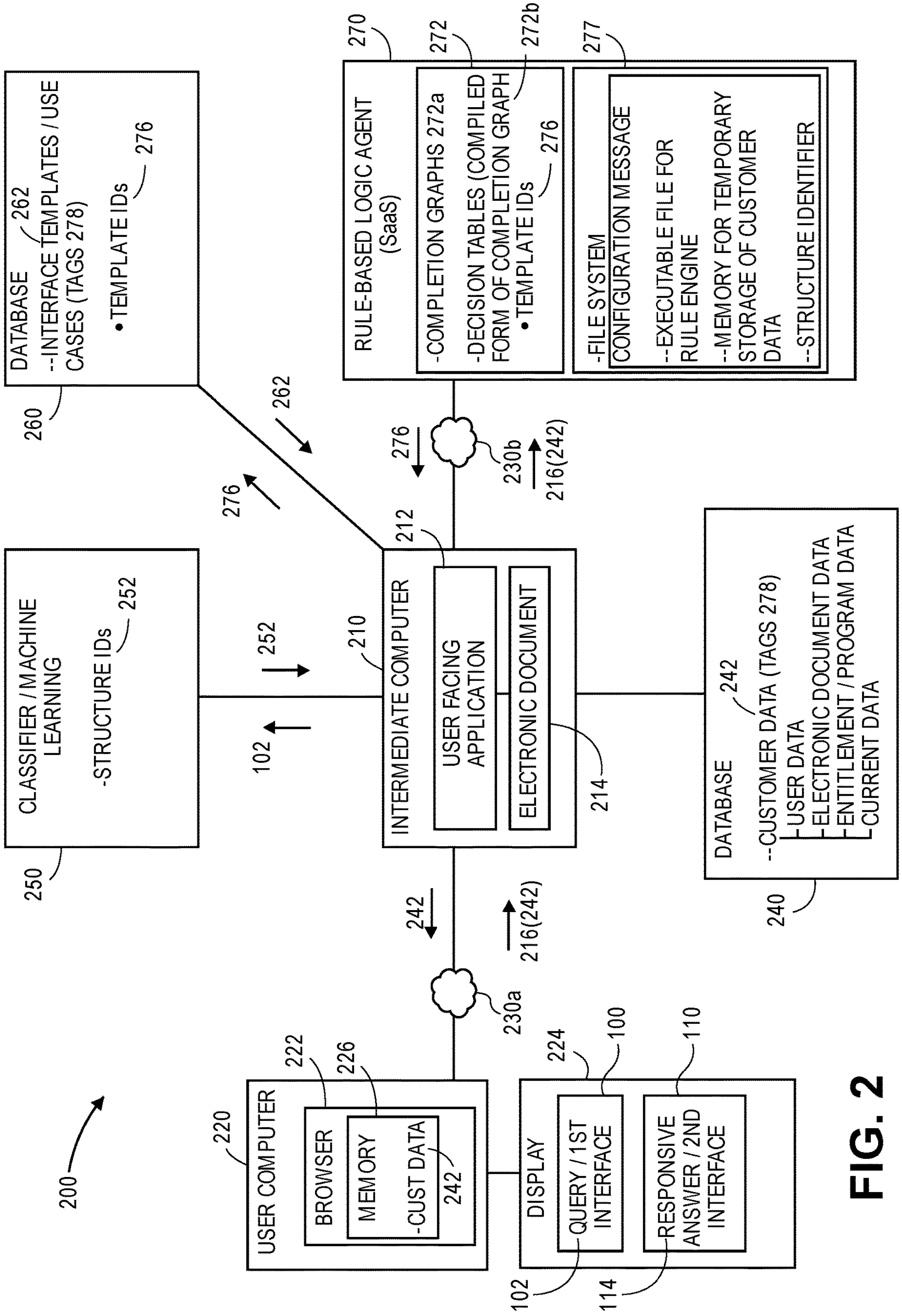
FIG. 2 depicts a computing system constructed according to one embodiment for generating user interfaces with personalized query responses.

Referring to FIG. 2, a networked computing system 200 constructed according to one embodiment and programmed or configured to execute computer-implemented methods includes an intermediate computer 210 that hosts a user facing application or program 212 comprising computer-executable instructions stored in a memory of intermediate computer 210 and executed by a processor of intermediate computer 210. User facing applications 212 provide for a first interface 110 to submit query 102 by, for example, selecting a "help" menu or UI element. Non-limiting examples of user facing application 212 include an online tax return preparation application, a computerized financial management system, and a computerized accounting application, which are operable to prepare various electronic documents 214 such as one or more of an electronic tax return, electronic financial statements and other electronic documents. For ease of explanation, reference is made to user facing application 212 and electronic document 214, and it will be appreciated that embodiments may be executed or utilized by various types of user facing applications 212 that include a "help" section or menu item through which a query originates and is submitted and through which a response is presented including word processing applications, spreadsheet applications and Internet browsers and web pages presented through Internet browsers.

Intermediate computer 210 is in communication through a first network 230*a* with a user computing device 220 that executes a browser 222 to access user facing application 212, interview screens or interfaces of which are presented to user through a display 224 of computing device 220. Examples of network 230*a* and other networks including network 230*b* (generally, network 230) discussed herein that may be utilized for communications between system 200 components including Internet communications include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 230 generally, but various networks, combinations of networks and communication systems, methods and protocols may be utilized depending on the system components employed. Examples of browsers 222 include INTERNET EXPLORER browser, GOOGLE CHROME browser and MOZILLA FIREFOX browser (capitalization reflecting registered trademarks).

Intermediate computer 210 hosts or is in communication through a network with a customer database 240. Customer database 240 includes electronic data 242 of user and/or electronic documents thereof. For electronic document 214 of an electronic tax return, customer data database 240 may include electronic tax return data in a Modernized e-File (MeF) schema. MeF is a web-based system that allows electronic filing of corporate, individual, partnership, exempt organization and excise tax returns through the Internet with a tax authority and uses Extensible Markup Language (XML) format. It will be understood that the format of electronic data in the customer data database 240 depends on the electronic documents being prepared and user facing applications and associated communications utilized such that MeF is provided as one example schema for the customer data database 240.

Intermediate computer 210 also hosts or is in communication with a machine learning component such as a computer executable classifier 250. Classifier 250 is operable to analyze query 102 terms, whether the query is in the form of a single term, multiple terms or a question entered by the user. Classifier 250 is implemented using machine learning techniques such as Bayesian classification and term frequency/inverse document frequency (TF-IDF) to extract intent from query 102. Models are curated and updated as needed to improve accuracy, add new queries or query components and address questions as observed by the log of searches. For ease of explanation, reference is made generally to classifier 250.

Intermediate computer 210 also hosts or is in communication through a network with an interface template database 260. Interface template database 260 includes a plurality of interface templates 262 for respective interview screens or interfaces of user facing application 212. Interface templates may be Hypertext Transfer Protocol (HTTP) templates for use with browser 222 executed by user computing device 220. This specification or figures thereof may refer to interface template or a "use case" interchangeably. As discussed above with reference to FIGS. 1A-B, interface templates 262 include certain programmed or pre-determined portions 116 (e.g., descriptions applicable to all users), and fields to eventually be populated with user specific or electronic specific data 115 retrieved from customer data database 240.

Intermediate computer 120 is in communication with a remote or cloud computing resource 270 (referred to as remote computer 270). Remote computer 270 includes various data structures 272 and provides for rule-based processing of certain customer data 242 using a selected data structure 272 to identify an interface template or use case 262 for eventual population by user facing application 212. For these purposes, embodiments may utilize cloud-based computing resources that host Software as a Service (SaaS) or Infrastructure as a Service (IaaS) for analyzing customer data 242 relative to data structures 272 loaded to remote computer 270. One example of a cloud computing resource or remote computer 270 that may be utilized and configured for use with embodiments is a computing resource of Amazon Web Services (AWS), which provides for storage of data structures and rule-based analysis applications utilized with embodiments. For ease of explanation, reference is made generally to a remote computer or remote computer 270, which is loaded with data structures 272 provided by the host, but it will be understood that embodiments are not so limited.

Figure 3:
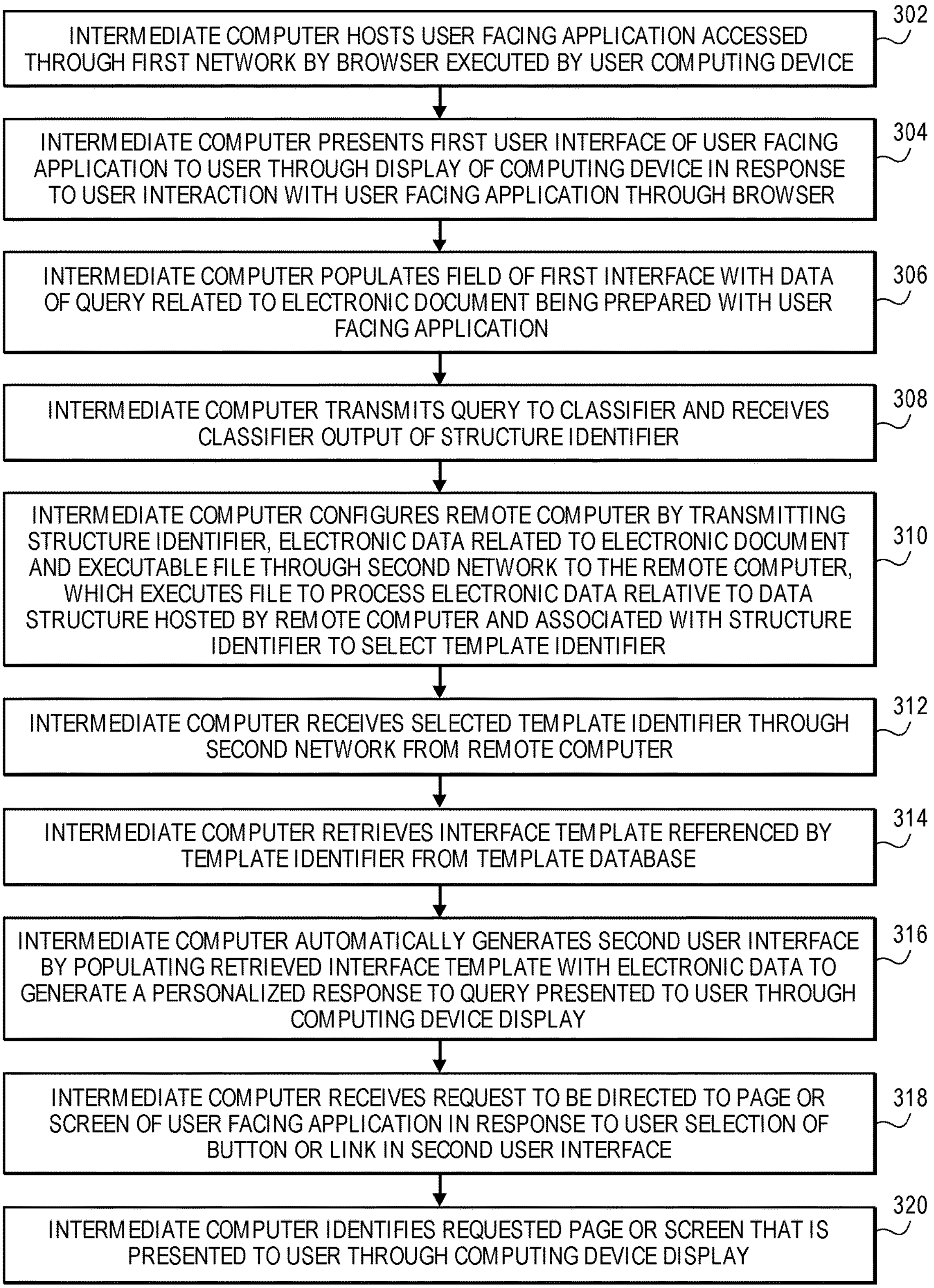
FIG. 3 is a flow diagram of one embodiment of an algorithm for a computer-implemented method for generating personalized query responses.

Referring to FIG. 3, having described computing system 200 constructed according to one embodiment, one embodiment of a computer-implemented method 300 that is executed utilizing system 200. While certain processing is described as being performed by intermediate computer 210, it will be understood that said processing may be by user facing application 212 executed or hosted by intermediate computer 210.

At 302, intermediate computer 210 hosting user facing application 212 is accessed through first network 230*a* by browser 222 executed by user's computing device 220, and at 304, intermediate computer 220 presents first user interface 110 of user facing application 212 to user through display 224 in response to user interaction with user facing application 212 through browser 222. At 306, intermediate computer 210 populates a field of first interface 110 with data of query 102 related to electronic document 214 and entered by user into query field 104. At 308, intermediate computer 210 transmits query 102 to classifier 250, which processes query 102 and generates an output in the form of data structure identifier 252.

After classifier 250 processing, at 310, intermediate computer 210 configures remote computer 270 for execution. This involves intermediate computer 210 generating an electronic message 216 including data structure identifier 252, electronic data 242 related to electronic document 214 and/or user and retrieved from the customer data database 240, and an executable file 274 to be executed by remote computer 270. Electronic message 216 is transmitted through second network 230*b* to remote computer 270, which executes file 274 to process electronic data 242 relative to data structure 272 hosted by remote computer 270 and associated with structure identifier 252 to select a template identifier 276.

At 312, after remote computer 270 processing, intermediate computer 210 receives selected template identifier 276 through second network 230*b* from remote computer 270, and at 314, retrieves from template database 260 an interface template 262 associated with template identifier 276. At 316, intermediate computer 210 generates second interface 110 by populating retrieved interface template 262 with electronic data 242. For this purpose, fillable fields of interface template 262 may be tagged 278 and electronic data 242 with respective corresponding tags 278 is identified in customer data database 240 and used to populate corresponding tagged 278 fillable fields of interface template 262 associated with template identifier 276 provided by remote computer 270 and forwarded by intermediate computer 210.

The resulting composite or hybrid second interface 110 includes programmed template 262 portions and certain electronic data 242 to generate a personalized response 114 to query 102, and personalized response 114 is presented to user through computing device display 224 by browser 222 accessing user facing application 212. At 318, second interface 110 may also include active UI element 118 such as interactive button or link, and intermediate computer 110 receives a request to be directed to a page or screen of user facing application 212 in response to user selection of UI element 118 of second interface 110. At 320, user facing application 212 identifies the requested page or screen that is presented to user through computing device display 224.

Figure 4:
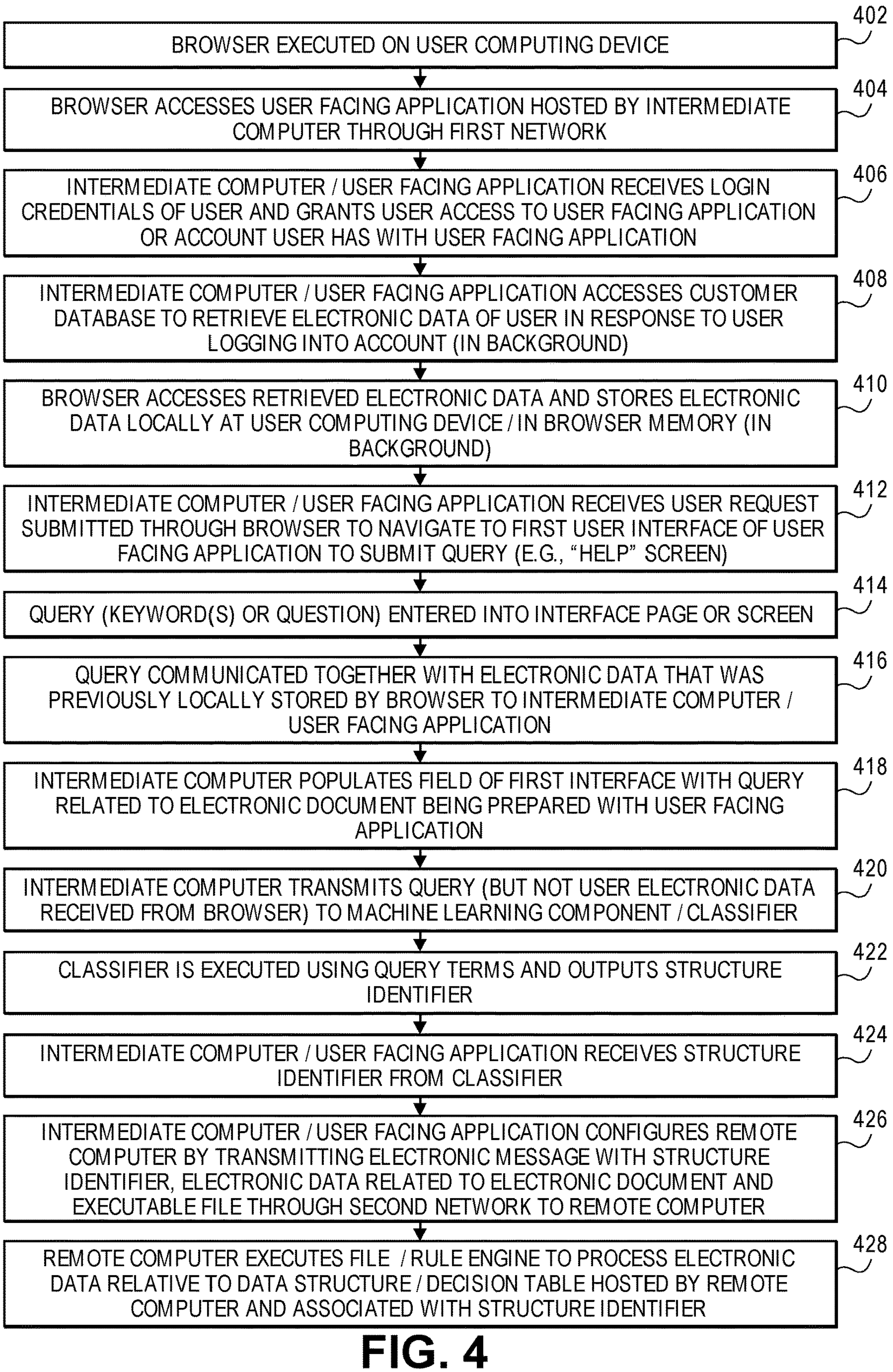
FIG. 4 is a flow diagram of another embodiment of an algorithm for a computer-implemented method for generating personalized query responses.
Figure 4:
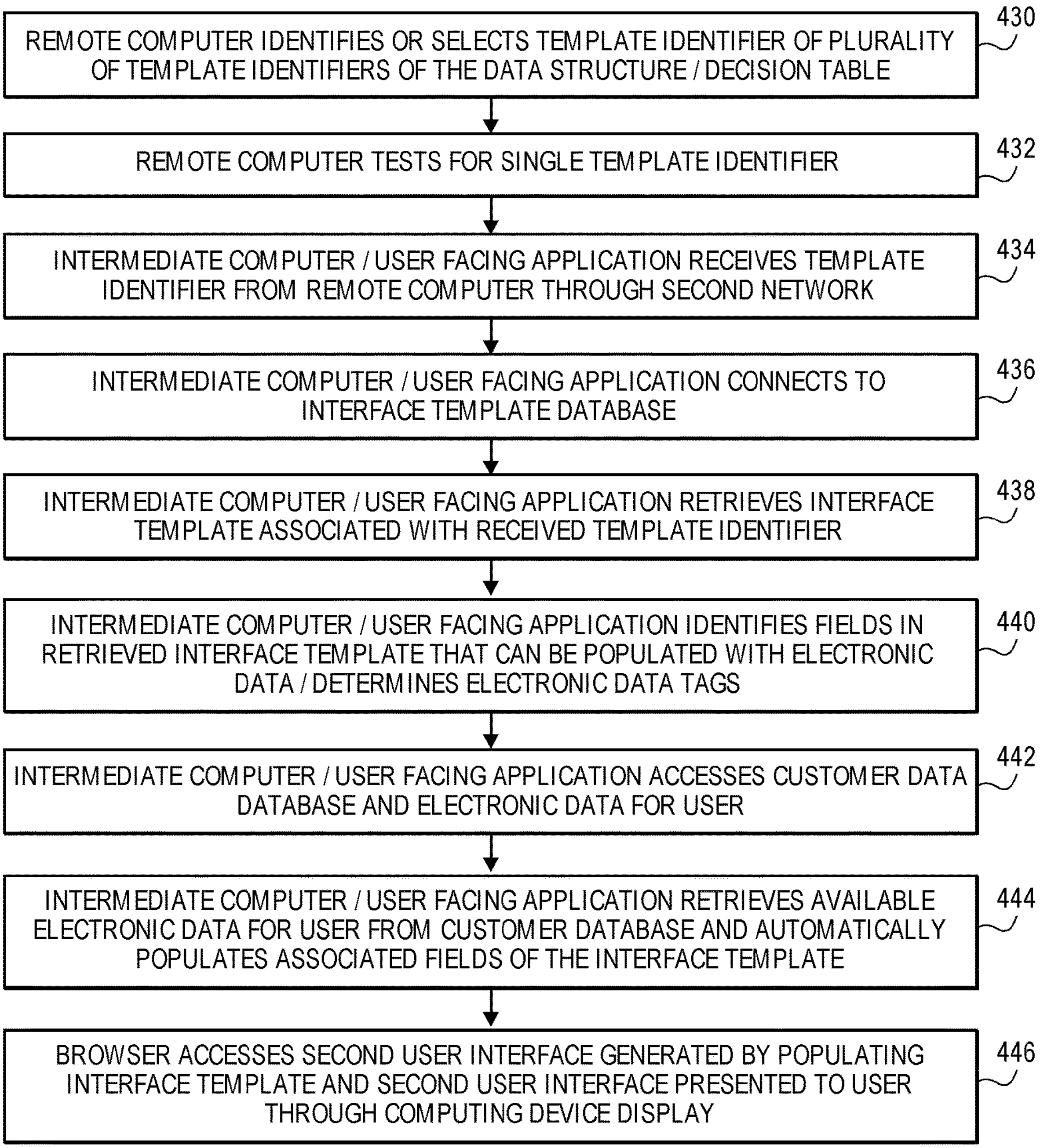

FIG. 4 illustrates further details of one embodiment of a computer-implemented method 400 may be executed utilizing distributed networked computing system 200 illustrated in FIG. 2. At 402, browser 222 is executed by user computing device 220, and at 404, browser 222 accesses user facing application 212 hosted by intermediate computer 210 through first network 220*a*. At 406, the user provides log in credentials to user facing application 212, and assuming the log in credentials are correct, user facing application 212 grants the user access to the user's account or to utilize the user facing application 212. At 408, and in the background (without knowledge of the user), user facing application 212 accesses customer data database 240 to retrieve electronic data 242 of the user or of the electronic document 214 in response to the user logging into account. This electronic data 242 may also include current date data and/or the entitlement or version of user facing application (e.g., whether a basic or more advanced version of the user facing application) if subsequent processing by remote computer 270 considers this data in the analysis (e.g., for comparisons of rules or criteria involving dates).

At 410, this electronic data 242 is accessed or received by browser 222 (illustrated by arrow 242 from intermediate computer 210 to user computer 220 in FIG. 2). Browser 222 stores the received electronic data 242 locally at user computing device 220 in browser memory 226.

At 412, user facing application 212 receives a user request submitted through browser 222 to navigate to first interface 110 of user facing application 212 to submit query 102 (e.g., navigates to a "help" screen, query portion of which is shown in FIG. 1A as an example).

At 414, query 102, which may be a keyword (as shown in FIG. 1A), keywords or a question, is entered into field 104 of first interface 100 by user, and at 416, query 102, together with electronic data 242 that was previously locally stored 226 by browser 222, is communicated to intermediate computer 210 through network 230*a* to user facing application 212. This is illustrated by arrow (226/242) from user computing device 220 to intermediate computer 210 in FIG. 2.

At 416, intermediate computer 210 transmits query 102 (but not user electronic data 242 received from browser 222 and that was locally stored by browser 222) to classifier 250, and at 418, field 104 of first interface 100 is populated with query.

At 420, intermediate computer 210 forwards or transmits query 102 (but not user electronic data 242 received from browser 222) to machine learning component/classifier 250, which processes the query 102 at 422 and outputs an identifier 252 of a data structure 272, also referred to as a structure identifier 252. Structure identifier 252 uniquely identifies a data structure 272 in the form of a decision table 272*b*, which is a data structure resulting from compiling or transforming a first different data structure 272*a* in the form of a completion graph to a second data structure in the form of decision table 272*b*.

At 424, user facing application 212 receives structure identifier 252 from classifier 250, and at 426, configures remote computer 270 by transmitting electronic message 216 with structure identifier 252, electronic data 242 related to electronic document and executable file 274 through second network 230*b* to a file system 277 of remote computer 270. Electronic data 242 is temporarily provided to remote computer 270 for of this processing and is not stored permanently by remote computer 270.

Figure 5:
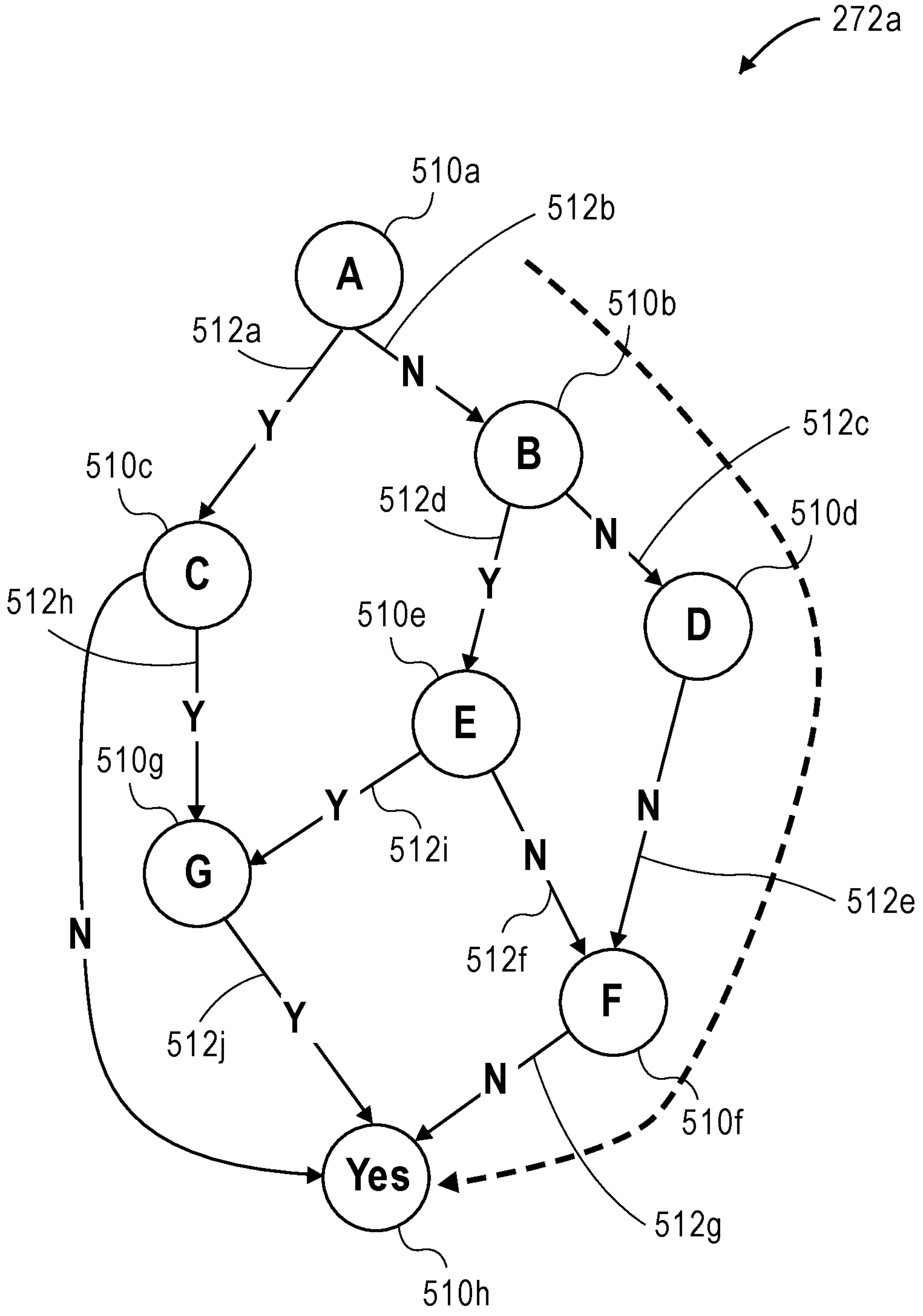
FIG. 5 generally illustrates an example of a data structure in the form of a completion graph utilized by embodiments.
Figure 6:
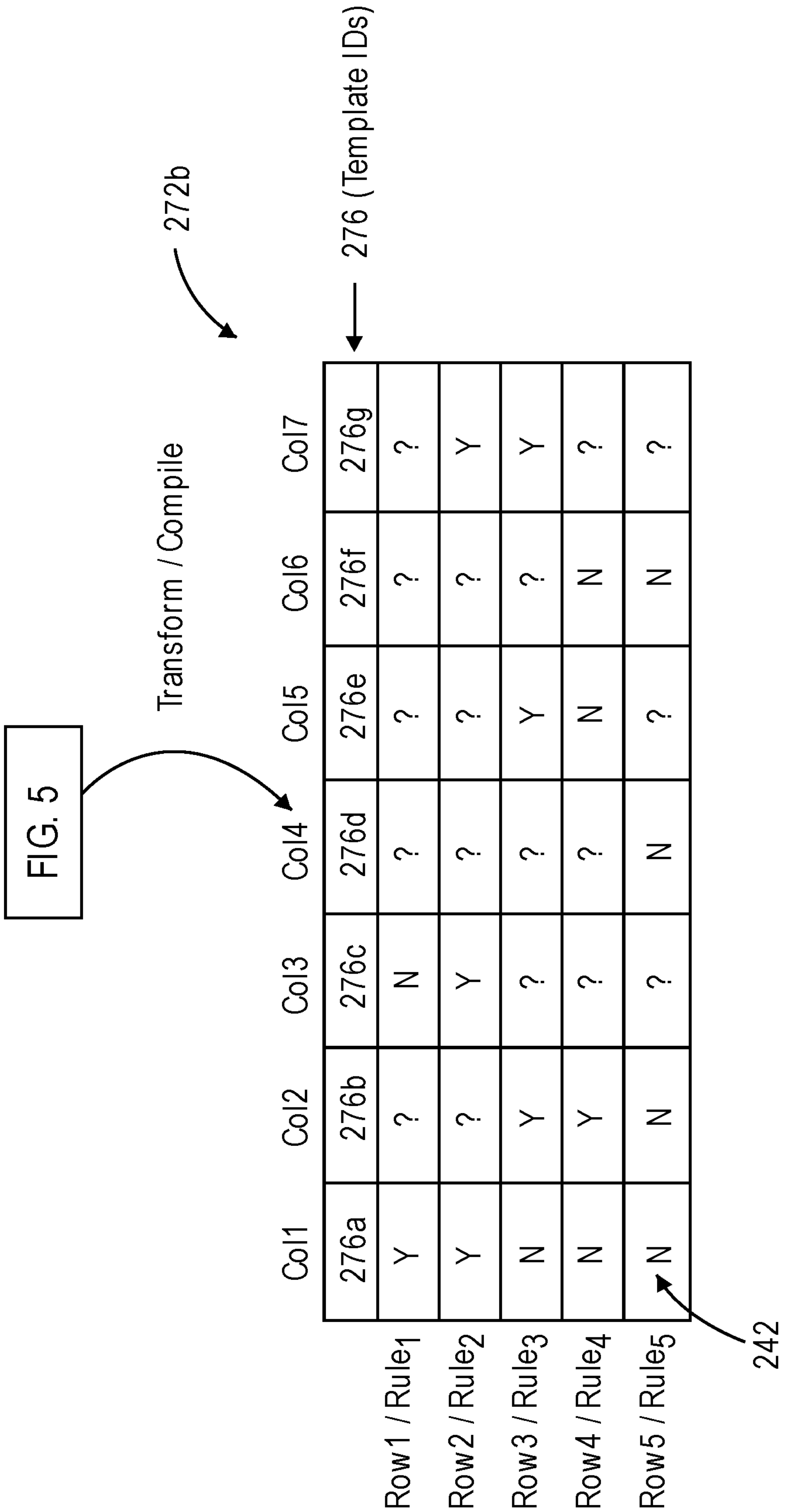
FIG. 6 generally illustrates an example of a data structure in the form of a decision table utilized by embodiments generated by converting or compiling the completion graph illustrated in FIG. 5

FIGS. 5-6 generally illustrate data structures in the form of completion graphs 272*a* and decision tables 272*b*. At least decision tables 272*b* are loaded to remote computer 270. Decision tables 272*b* are data structures resulting from compiling or converting completion graph 272*a*, which is a different data structure format but comprising the same information represented in a different structural form and free of logical flow relationships. FIG. 5 generally illustrates how a first data structure in the form of completion graph 272*a* may generally be configured, and FIG. 6 illustrates how a completion graph 272*a* is compiled or transformed into a different, second data structure in the form of a decision table 272*b*. It will be understood that FIGS. 5-6 illustrating completion graph 272*a* and decision table 272*b* structures are simplified examples intended to generally illustrate how data structure transformation may be implemented and how a decision table 272*b* identified by structure ID 252 can be used to select a template identifier 276 associated with a column given a current set of electronic data 242

A completion graph 272*a* is a data structure in the form of a tree or logical flow and is generally illustrated in the form of a tree with nodes and arcs. A node contains a condition that may be expressed as a Boolean expression that can be answered in the affirmative or negative. A completion graph 272*a* may include a beginning node (Node A), intermediate nodes (Nodes B-G) and a termination node. Arcs that connect nodes illustrate the dependencies between nodes or response options. In the illustrated embodiment, each internode connection represents an answer or response option in binary form (Y/N), for instance, a response to a Boolean expression. It will be understood, however, that embodiments are not so limited. The directed graph or completion graph 272*b* generally illustrated in FIG. 5 can be traversed through possible paths from the start node to the termination node, and in doing so, these pathways are compiled and transformed or converted into a different data structure or format which, in the illustrated embodiment, is in the form of a table 272*b* with columns, rows and cells defined by respective columns and row intersections as shown in FIG. 6 for available electronic data 242 that is known.

In the illustrated example, table 272*b* includes rows (five rows are illustrated) based on the paths through completion graph 272*a* and define respective rules. Columns of table 272*b* are associated with respective template identifiers 276*a*-g. The data structure in the form of a table 272*b* resulting from compiling of the completion graph 272*a* can be used to drive a personalized query response 114. In particular, the decision table 272*b* is used to eliminate rows or rules that do not apply based on available electronic data 242 which, in turn, eliminates certain columns, thus resulting in a remaining column and associated identifier 276 of a template 262, which will be used for the second interface to be generated in response to the query 102.

Figure 7:
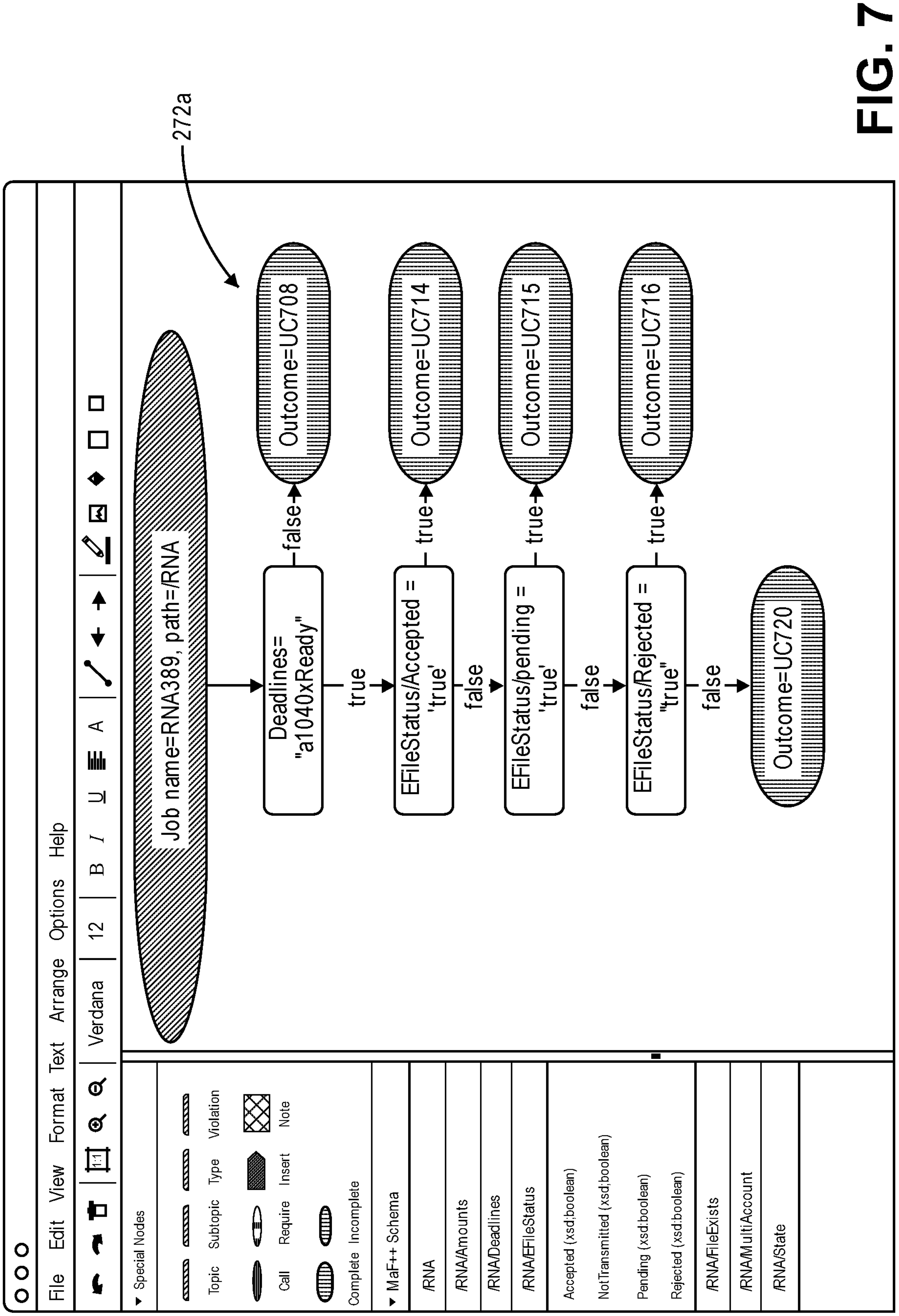
FIG. 7 illustrates an example of an interactive user interface generated by a graph editor program that can be utilized to generate a completion graph utilized by embodiments.

FIG. 7 illustrates an example of how completion graphs 272*a* (prior to processing by a compiler or transformation into a decision table 272*b* by completion graph 272*a* path traversal) are created and structured, e.g., using a "drag and drop" type application 700 that is utilized add and link associated functions and conditions and reflecting graph topology (node identifiers, node structures, conditions and which use cases or interface templates are associated with respective condition results). Appendix A provides an example of programming of a completion graph 272*a* in Extensible Markup Language (XML) that is generated using this type of application. Appendix B provides an example of resulting XML code resulting from the completion graph 272*a* being compiled or transformed into a decision table 272*b* by traversal of paths through a completion graph 272*a*.

Referring again to FIG. 4, at 428, remote computer 270, having received electronic message 216 with configuration data from intermediate computer 210, executes file 274 to launch a rule engine and perform rule-based processing based on a decision table 272*b*, with the result that a single column of a decision table 272*b* is selected by rule-based processing in view of available electronic data 242. At 430, remote computer 270 identifies or selects a single template identifier 276 of plurality of template identifiers 276 or column of a plurality of columns of decision table 272*b* that is referenced by the structure identifier 252 output by the classifier 250, which identifies the a decision table 272*b* to be analyzed by remote computer 270. Further aspects a computerized rule-based processing system or aspects thereof that may serve as SaaS on remote computer 270 and further details regarding how rule-based processing may be executed using data structures described herein are described in U.S. Pat. No. 9,760,953, issued on Sep. 12, 2017 and U.S. application Ser. No. 14/448,481, issuing as U.S. Pat. No. 9,916,628 on Mar. 13, 2018, the contents of which are incorporated herein by reference as though set forth in full.

Continuing with reference to FIG. 4, at 432, remote computer 270 may confirm that a single template identifier 276 is selected, and if so, then at 434, the user facing application 212 receives template identifier 276 from remote computer 270 through second network 230*a*. To ensure that a single column of decision table 272*b*/single template identifier 276 is selected, a testing program may receive compiled data structures in the form of decisions tables 272*b*, e.g., decision table data is transferred into a computer executable spreadsheet such as EXCEL computerized spreadsheet 800 (example of which is provided in FIG. 8), which is then analyzed to generate a pass/fail HTML report 900 (example of which is provided in FIG. 9) indicating whether a single column or interface template identifier 276 has been identified, thus testing the rules embodied in the decision tables to confirm a single template identifier based on rule execution. This processing may be performed before decision tables 272*b* are loaded to remote computer 270.

Continuing with reference to FIG. 4, at 436, user facing application 212, having received the interface identifier 276 from remote computer 270, connects to interface template database 260, and at 438, retrieves an unpopulated interface template 262 from the template database 260 that is associated with received template identifier 276 determined by remote computer 270. Appendix C provides an example of how an interface template 262 or "use case" can be programmed.

At 440, user facing application 212 determines which fields can be populated, e.g., by determining tags 278 for unpopulated fields, and at 442, accesses customer data database 240 and electronic data 242 for user, At 444, the user facing application 212 identifies electronic data 242 in customer data database 240 associated with respective matching tags 278 and retrieves the electronic data 242 from customer data database 240 and automatically populates associated tagged fields of interface template 278 to at least partially or completely populated the interface template 278.

Having populated the interface template 278, at 446, browser 222 executed by the user computing device 220 accesses user facing application 212 and a second user interface 110 based on the populated interface template 278, and the second interface 110 is presented to the user through display 224 of computing device 220.

Figure 10:
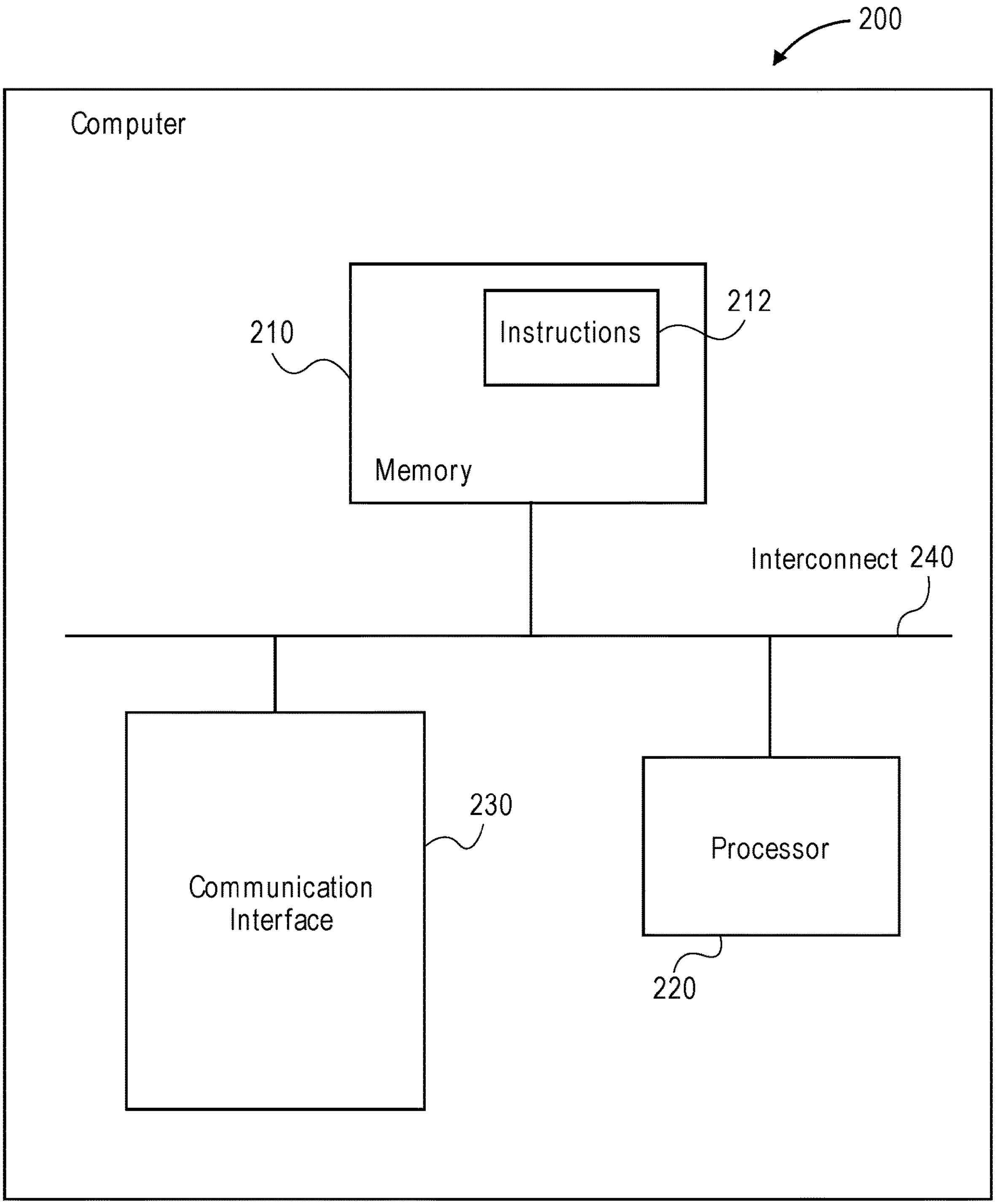
FIG. 10 illustrates generally the components of a computing device that may be utilized to execute embodiments for generating user interfaces including personalized responses to queries submitted through a computer-executable application.

FIG. 10 generally illustrates components of a computing device 1000 that may be utilized to execute embodiments and that includes a memory 1010, account processing program instructions 1012, a processor or controller 1020 to execute instructions 1012, a network or communications interface 1030, e.g., for communications with a network or interconnect 1040 between such components. The memory 1010 may be or include one or more of cache, RAM, ROM, SRAM, DRAM, RDRAM, EEPROM and other types of volatile or non-volatile memory capable of storing data. The processor unit 1020 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1040 may include a system bus, LDT, PCI, ISA, or other types of buses, and the communications or network interface may, for example, be an Ethernet interface, a Frame Relay interface, or other interface. The network interface 1030 may be configured to enable a system component to communicate with other system components across a network which may be a wireless or various other networks. It should be noted that one or more components of computing device 1000 may be located remotely and accessed via a network. Accordingly, the system configuration provided in FIG. 10 is provided to generally illustrate how embodiments may be configured and implemented.

Method embodiments may also be embodied in, or readable from, a non-transitory, computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1020 executes program instructions 1012 within memory 1010 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Further, where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. Accordingly, embodiments are intended to exemplify alternatives, modifications, and equivalents that may fall within the scope of the claims.

APPENDIX A (General Example - Completion Graph 272a)

```
<?xml version="1.0"?>
<mxGraphModel pageHeight="1169" pageWidth="826" pageScale="1" page="0"
fold="1" connect="1" tooltips="1" guides="1" grid="1">
<root>
        <mxCell id="0"/>
        <mxCell id="1" parent="0"/>
        <mxCell id="2" parent="1" vertex="1"
style="shape=.startfillColor=#ffffff;strokeColor=#000000;strokeWidth=2"
value="Job name=Amend Current Year, path=/RNA"><mxGeometry as="geometry"
height="60" width="588" y="10" x="10"></mxCell>
        <mxCell id="5" parent="1" vertex="1"
style="shape=.end;fillColor=#ffffff;strokeColor=#000000;strokeWidth=2"
value="Outcome=UC708"><mxGeometry as="geometry" height="60" width="196"
y="110" x="470"/></mxCell>
```

APPENDIX A-continued (General Example - Completion Graph 272a)

```
    <mxCell id="7" parent="1" vertex="1" style="rounded=1;whiteSpace=wrap"
value="EFileStatus/Accepted = 'true'"><mxGeometry as="geometry" height="40"
width="200" y="230" x="2047></mxCell>
    <mxCell id="9" parent="1" vertex="1"
style="shape=.end;fillColor=#ffffff;strokeColor=#000000;strokeWidth=2"
value="Outcome=UC714"><mxGeometry as="geometry" height="60" width="196"
y="220" x="470"/></mxCell>
    <mxCell id="10" parent="1" value="true" edge="1" target="9"
source="7"><mxGeometry as="geometry" relative="1"/></mxCell>
    <mxCell id="11" parent="1" vertex="1" style="rounded=1;whiteSpace=wrap"
value="EFileStatus/Pending = 'true'"><mxGeometry as="geometry" height="40"
width="192" y="320" x="2087></mxCell><mxCell id="12" parent="1" vertex="1"
style="shape=.end;fillColor=#ffffff;strokeColor=#000000;strokeWidth=2"
value="Outcome=UC715"><mxGeometry as="geometry" height="60" width="196"
y="310" x="470"/></mxCell><mxCell id="13" parent="1" value="true" edge="1"
target="12" source="11"><mxGeometry as="geometry" relative="1"/></mxCell>
    <mxCell id="14" parent="1" value="false" edge="1" target="11"
source="7"><mxGeometry as="geometry" relative="1"/></mxCell>
    <mxCell id="15" parent="1" vertex="1" style="rounded=1;whiteSpace=wrap"
value="EFileStatus/Rejected = "true""><mxGeometry as="geometry" height="40"
width="200" y="420" x="204"/></mxCell>
    <mxCell id="16" parent="1" style="entryX=0.5;entryY=0" value="false" edge="1"
target="15" source="11"><mxGeometry as="geometry" relative="1"/></mxCell>
    <mxCell id="17" parent="1" vertex="1"
style="shape=.end;fillColor=#ffffff;strokeColor=#000000;strokeWidth=2"
value="Outcome=UC716"><mxGeometry as="geometry" height="60" width="196"
y="410" x="470"/></mxCell>
    <mxCell id="18" parent="1" value="true" edge="1" target="17"
source="15"><mxGeometry as="geometry" relative="1"/></mxCell>
    <mxCell id="19" parent="1" vertex="1"
style="shape=.end;fillColor=#ffffff;strokeColor=#000000;strokeWidth=2"
value="Outcome=UC720"><mxGeometry as="geometry" height="60" width="196"
y="520" x="206"/></mxCell>
    <mxCell id="22" parent="1" value="false" edge="1" target="19"
source="15"><mxGeometry as="geometry" relative="1"/></mxCell>
    <mxCell id="23" parent="1" vertex="1" style="rounded=1;whiteSpace=wrap"
value="Deadlines/is1040xReady ='true'" ><mxGeometry as="geometry" height="40"
width="216" y="120" x="196"/></mxCell>
    <mxCell id="24" parent="1" edge="1" target="23" source="2"><mxGeometry
as="geometry" relative="1"/></mxCell>
    <mxCell id="25" parent="1" value="false" edge="1" target="5"
source="23"><mxGeometry as="geometry" relative="1"/></mxCell>
    <mxCell id="26" parent="1" value="true" edge="1" target="7" source="23">
    <mxGeometry as="geometry" relative="1"/>
</mxCell>
</root></mxGraphModel>
```

APPENDIX B (General Example - Decision Table 272b)

```
<?xml version="1.0" encoding="UTF-8" standalone="true"?>
<CompletenessJob xmlns="http://ctq.intuit.com/tke/completeness">
<PathJob name="Amend Prior Year 2015">
<Tree>
  <StartTargets>
    <Target id="3" index="0"/>
  </StartTargets>
  <Expression index="0">
    <Links>
      <LinksFromGraphNode graphId="3">
        <TargetLink complete="false" false="false" true="true">
          <Target id="5" index="1"/>
        </TargetLink>
        <TargetLink complete="false" false="true" true="false">
          <Target id="7" index="4"/>
        </TargetLink>
        </LinksFromGraphNode>
      </Links>
      <Expression>FileExists/ty2015='true'</Expression>
      <References>
        <Node>FileExists/ty2015</Node>
      </References>
    </Expression>
    <Expression index="1">
```

APPENDIX B-continued (General Example - Decision Table 272b)

```
    <Links>
      <LinksFromGraphNode graphId="5">
        <TargetLink complete="false" false="true"
      true="false">
          <Target id="13" index="2"/>
      </TargetLink>
      <TargetLink complete="false" false="false" true="true">
        <Target id="14" index="3"/>
        </TargetLink>
      </LinksFromGraphNode>
    </Links>
    <Expression>Entitlement/isEntitled='true'</Expression>
    <References>
        <Node>Entitlement/isEntitled</Node>
    </References>
  </Expression>
  <Outcome index="2" result="UC267">
    <GraphNodes>
        <id>13</id>
    </GraphNodes>
  </Outcome>
<Outcome index="3" result="UC268">
  <GraphNodes>
    <id>14</id>
```

APPENDIX B-continued (General Example - Decision Table 272b)

```
        </GraphNodes>
    </Outcome>
    <Expression index="4">
        <Links>
            <LinksFromGraphNode graphId="7">
                <TargetLink complete="false" false="false" true="true">
                <Target id="9" index="5"/>
            </TargetLink><TargetLink complete="false" false="true"
            true="false">
                <Target id="11" index="6"/>
                </TargetLink>
            </LinksFromGraphNode>
        </Links>
        <Expression>MultiAccount/ty2015MA='true'</Expression>
        <References>
            <Node>MultiAccount/ty2015MA</Node>
            </References>
            </Expression>
            <Outcome index="5" result="UC271">
            <GraphNodes>
                <id>9</id>
                </GraphNodes>
            </Outcome>
            <Outcome index="6" result="UC273">
            <GraphNodes>
                <id>11</id>
            </GraphNodes>
        </Outcome>
    </Tree>
    <Context multiCopy="false" optional="false">
<Path>/RNA</Path></Context></PathJob>
</CompletenessJob>
```

APPENDIX C (General Example - Interface Template/"Use Case" 262)

```
{
    "useCaseId": 708,
    "useCaseName": "Before Feb. 15",
    "useCaseTitle": "How do I amend my 2016 TurboTax Online return?",
    "topic": "Amend Current Year w/ Date 2016",
    "published": true,
    "lastPublishedDate": 1487376776168,
    "template": "Template =Title, Body, and Action",
    "content": "<p>Before proceeding, make sure you
<ahref=\"https://ttlc.intuit.com/questions/1908543\" data-ng
click=\"shepClick('https://ttlc.intuit.com/questions/1908543',$event)\"
target=\"_blank\">really need to amend<a>.</p><p>Then, simply click
the button and we'll walk you through amending your taxes.</p>",
    "action": "Amend 2016",
    "testName": null,
    "testRecipe": null,
    "footer": null,
    "authorNotes": null,
    "lastUpdatedBy": "knagoda",
    "lastUpdatedDate": 1487376776168,
    "tags": [ ],
    "venues": [
        {
            "venueId": 2,
            "venueValue": "MyTTO stationary"
        },
        {
            "venueId": 1,
            "venueValue": "TTO stationary"
        }
    ]
}
```

What is claimed is:

1. A computer-implemented method, comprising:

an intermediate computer, in communication through a first network with a computing device executing a browser to access a user facing application hosted by the intermediate computer and executed to prepare an electronic document, presenting a first user interface of the end user application to a user through a display of the computing device in response to user interaction with the user facing application through the browser, the first interactive interface comprising a field into which a query about the electronic document is entered;

the intermediate computer, by the user facing application, transmitting the query to a computer executable classifier and receiving an output generated by the computer executable classifier processing the query via a machine learning algorithm, the output comprising a structure identifier;

the intermediate computer, by the user facing application, configuring a remote computer by transmitting the structure identifier, electronic data related to the electronic document and an executable file through a second network to the remote computer, the remote computer executing the executable file to process the electronic data relative to a data structure hosted by the remote computer and associated with the structure identifier to select a template identifier from a plurality of template identifiers of the associated data structure, wherein to process the electronic data:

the remote computer hosts multiple data structures with at least a first data structure format and a second data structure format such that the first data structure format is compiled or transformed into the second data structure format, and when the second data structure format is a decision table, eliminate at least one row of multiple rows of the decision table based on whether the at least one row contains a first predefined value and eliminate at least one column of multiple columns of the decision table based on rows remaining in the decision table, wherein the multiple rows define rules associated with the electronic data and the multiple columns define the plurality of template identifiers, the intermediate computer, by the user facing application, receiving the selected template identifier from the remote computer and retrieving an interface template referenced by the template identifier from an interface template database; and the intermediate computer, by the user facing application, automatically generating a second user interface by populating the interface template with electronic data related to the electronic document to generate a personalized response to the query, the second user interface being presented to the user through the display of the computing device.

2. The computer-implemented method of claim 1, wherein the remote computer that executes the executable file is a computer of a cloud services platform.

3. The computer-implemented method of claim 1, wherein the query includes a plurality of words forming a question related to the electronic document.

4. The computer-implemented method of claim 1, wherein the query is a single word indicating a topic or category of a question related to the electronic document.

5. The computer-implemented method of claim 1, wherein the computing device, the computer executable classifier, and the interface template database are located remotely relative to the intermediate computer and the remote computer and in communication with the intermediate computer through respective networks.

6. The computer-implemented method of claim 1, wherein the computer executable classifier, the interface template database and a database of electronic user data are located remotely relative to the intermediate computer and the remote computer and are in communication with the intermediate computer through respective networks.

7. The computer-implemented method of claim 1, wherein the computer executable classifier and the remote computer execute independently of each other and are not in communication with each other.

8. The computer-implemented method of claim 1, wherein the intermediate computer, by the user facing application, configures the remote computer for execution by transmitting the structure identifier, the electronic data related to the electronic document and the executable file in a single electronic message transmitted through the second network to the remote computer.

9. The computer-implemented method of claim 1, wherein the remote computing device is a stateless computing device such that the electronic data transmitted to the remote computing device and processed by executing the executable file is temporary data that is deleted by the remote computer after the template identifier has been selected.

10. The computer-implemented method of claim 1, wherein the interface template is a Hypertext Transfer Protocol (HTTP) template.

11. The computer-implemented method of claim 1, wherein respective interface templates are associated with respective different template identifiers in the template database accessed by the intermediate computer.

12. The computer-implemented method of claim 1, wherein the user facing application is an online computerized tax return preparation application, and the electronic document is an electronic tax return.

13. The computer-implemented method of claim 1, wherein the user facing application is an online accounting application, and the electronic document is an electronic financial statement or form.

14. The computer-implemented method of claim 1, wherein the first data structure format is a graphical data structure and the second data structure is a table data structure resulting from transforming or compiling the graphical data structure.

15. The computer-implemented method of claim 1, wherein the user is granted access to the user facing application and the field is populated with the query after the user has logged into the user facing application.

16. The computer-implemented method of claim 1, the intermediate computer retrieving the electronic data from a database in response to the user being granted access the user facing application, wherein the electronic data is accessed by the browser and stored locally by the browser executing on the computing device, and wherein the electronic data stored by the browser is provided by the intermediate computer to the remote computer to configure the remote computer for execution.

17. The computer-implemented method of claim 16, wherein the query is provided by the intermediate computer to the computer executable classifier, and the electronic data locally stored in the browser and provided to the intermediate computer is not provided to the computer executable classifier.

18. The computer-implemented method of claim 1, wherein the query comprises at least one keyword entered by the user into the field of the first user interface, and the second user interface is structured to include a pre-determined question related to the at least one keyword and a personalized answer incorporating the electronic data.

19. The computer-implemented method of claim 1, the second user interface further comprising a button or link to selectable by the user through the user facing application to execute a pre-determined action based on the personalized answer.

20. The computer-implemented method of claim 1, wherein the user facing application is a computerized tax return preparation application operable to prepare an electronic tax return, the query entered into the first user interface comprises a keyword related to the electronic tax return, and the second user interface comprises pre-determined related to electronic tax return, a personalized answer incorporating electronic tax return data, and a button or link selectable by the user through the user facing application to execute a pre-determined action concerning the electronic tax return.

21. A non-transitory computer-readable medium comprising instructions, which when executed by a processor of an intermediate computer in communication with a computing device of a user through a first network and executing a browser to access a user facing application hosted by the intermediate computer and executed to prepare an electronic document and in communication with a remote computer through a second network, causes the intermediate computer to execute a process comprising:

presenting a first user interface of the end user application to the user through a display of the computing device in response to user interaction with the user facing application through the browser, the first interactive interface comprising a field into which a query about the electronic document is entered;

transmitting the query to a computer executable classifier;

receiving an output generated by the computer executable classifier processing the query via a machine learning algorithm, the output comprising a structure identifier;

configuring a remote computer by transmitting the structure identifier, electronic data related to the electronic document and an executable file through a second network to the remote computer, the remote computer executing the executable file to process the electronic data relative to a data structure hosted by the remote computer and associated with the structure identifier to select a template identifier from a plurality of template identifiers of the associated data structure, wherein to process the electronic data:

the remote computer hosts multiple data structures with at least a first data structure format and a second data structure format such that the first data structure format is compiled or transformed into the second data structure format, when the second data structure format is a decision table, eliminate at least one row of multiple rows of the decision table based on whether the at least one row contains a first predefined value and eliminate at least one column of multiple columns of the decision table based on rows remaining in the decision table, wherein the multiple rows define rules associated with the electronic data and the multiple columns define the plurality of template identifiers;

receiving the selected template identifier from the remote computer and retrieving an interface template referenced by the template identifier from an interface template database; and automatically generating a second user interface by populating the interface template with electronic data related to the electronic document to generate a personalized response to the query, the second user interface being presented to the user through the display of the computing device.

22. A computerized system, comprising:

an intermediate computer in communication with a computing device of a user through a first network and executing a browser to access a user facing application hosted by the intermediate computer and executed to prepare an electronic document;

the intermediate computer being programmed or configured to present a first user interface of the end user application to the user through a display of the computing device in response to user interaction with the user facing application through the browser, the first interactive interface comprising a field into which a query about the electronic document is entered;

transmit the query to a computer executable classifier;

receive an output generated by the computer executable classifier processing the query via a machine learning algorithm, the output comprising a structure identifier;

configure a remote computer by transmitting the structure identifier, electronic data related to the electronic document and an executable file through the second network to the remote computer, the remote computer being programmed or configured to execute the executable file to process the electronic data relative to a data structure hosted by the remote computer and associated with the structure identifier to select a template identifier from a plurality of template identifiers of the associated data structure, wherein to process the electronic data:

the remote computer hosts multiple data structures with at least a first data structure format and a second data structure format such that the first data structure format is compiled or transformed into the second data structure format, when the second data structure format is a decision table, eliminate at least one row of multiple rows of the decision table based on whether the at least one row contains a first predefined value and eliminate at least one column of multiple columns of the decision table based on rows remaining in the decision table, wherein the multiple rows define rules associated with the electronic data and the multiple columns define the plurality of template identifiers;

receive the selected template identifier from the remote computer;

retrieve an interface template referenced by the template identifier from an interface template database; and automatically generate a second user interface by populating the interface template with electronic data related to the electronic document to generate a personalized response to the query, the second user interface being presented to the user through the display of the computing device.

23. The computerized system of claim 22, further comprising the remote computer.

24. The computerized system of claim 23, further comprising the computer executable classifier and the interface template database.

* * * * *